United States Patent [19]

Hopwood

[11] Patent Number: 5,549,268
[45] Date of Patent: Aug. 27, 1996

[54] APPARATUS AND METHOD FOR HOLDING PAPER

[76] Inventor: Jeffrey J. Hopwood, 1313 Commercial, Bellingham, Wash. 98225

[21] Appl. No.: 368,918

[22] Filed: Jan. 5, 1995

[51] Int. Cl.$^6$ .................................................. A47F 5/00
[52] U.S. Cl. ........................... 248/442.2; 248/316.5
[58] Field of Search ........................ 248/225.31, 229, 248/231.5, 231.8, 316.1, 316.5, 316.7, 298, 441.1, 442.2, 447.1, 447.2, 917, 918, 451

[56] References Cited

U.S. PATENT DOCUMENTS

| | | | |
|---|---|---|---|
| 767,132 | 8/1904 | Auld | 248/442.2 |
| 2,006,887 | 7/1935 | Doherty | 120/28 |
| 2,538,326 | 1/1951 | Popick | 24/81 |
| 2,779,076 | 1/1957 | Schenck, Sr. | 24/137 |
| 3,689,687 | 9/1972 | Bosch | 248/316.5 X |
| 4,189,055 | 2/1980 | Nohzuka | 211/119 |
| 4,569,498 | 2/1986 | Ermanski | 248/441.1 |
| 4,693,443 | 9/1987 | Drain | 248/447 |
| 4,958,907 | 9/1990 | Davis | 248/316.5 X |
| 5,103,384 | 4/1992 | Drohan | 362/191 |
| 5,104,088 | 4/1992 | Bakanowsky, III | 248/442 |
| 5,125,612 | 6/1992 | McNeal | 248/442 |

*Primary Examiner*—Alvin C. Chin-Shue
*Assistant Examiner*—Sarah L. Purol
*Attorney, Agent, or Firm*—Hughes, Multer & Schacht, P.S.

[57] ABSTRACT

A paper holding device comprising an elongate member having a clip attached to each end thereof. One of these clips is adapted to attach an end of the elongate member to a structural member adjacent to a computer screen. The other of these clips is adapted to engage and hold the sheet of paper relative to the other end of the elongate flexible member. The elongate member itself may be manually reconfigured to adjust the position of the sheet of paper until it is in desired orientation for viewing.

2 Claims, 5 Drawing Sheets

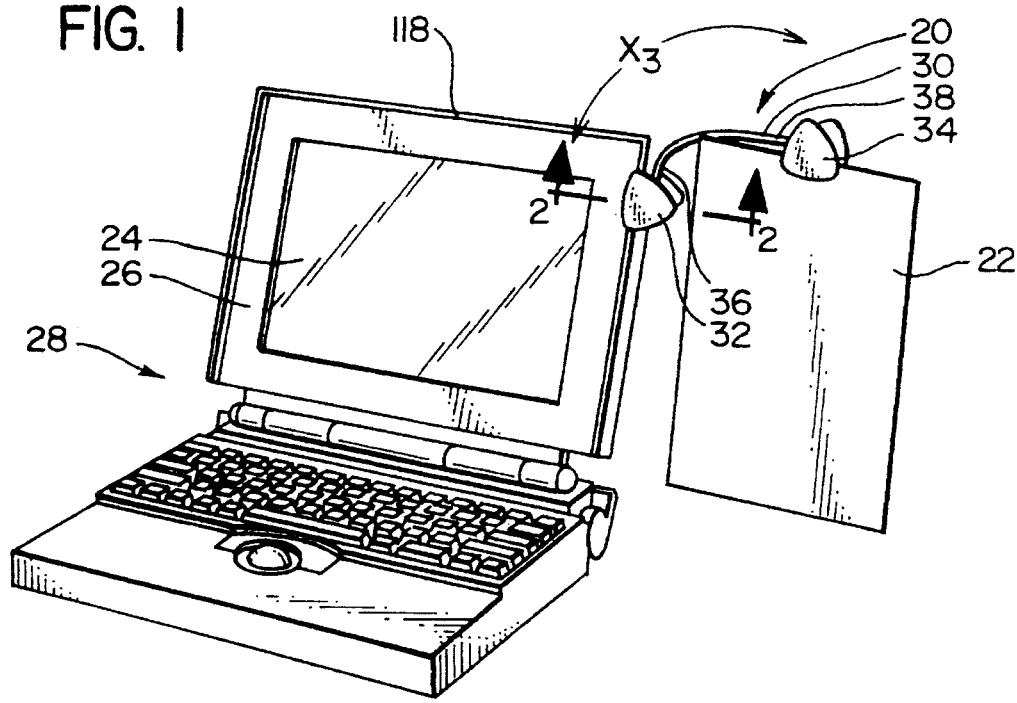
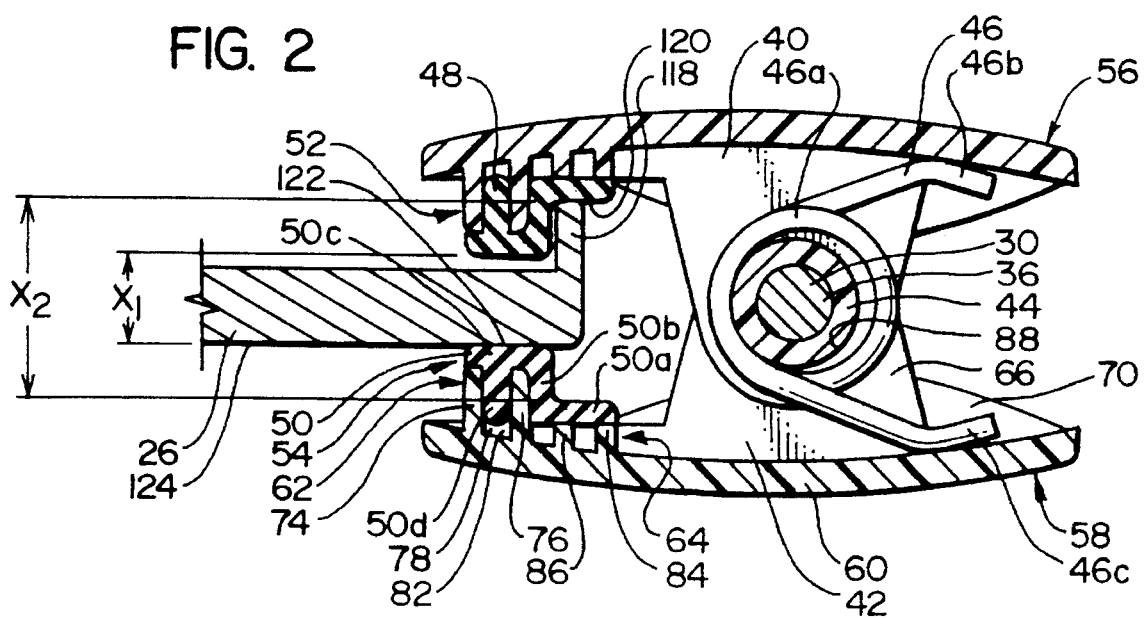

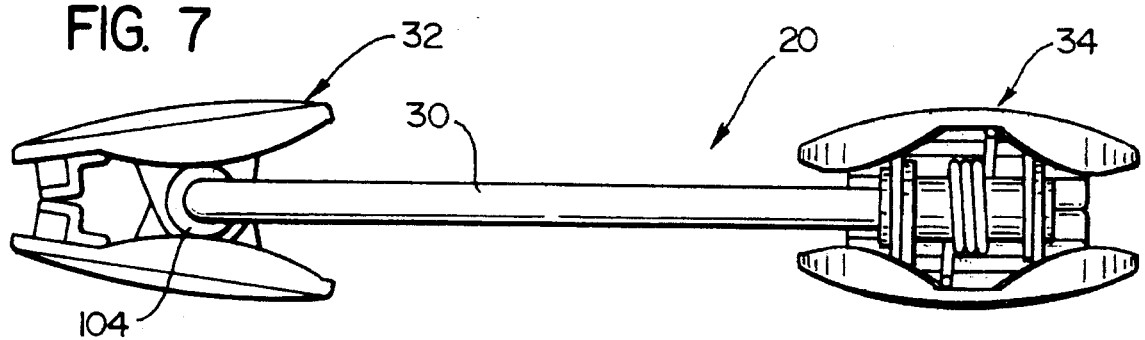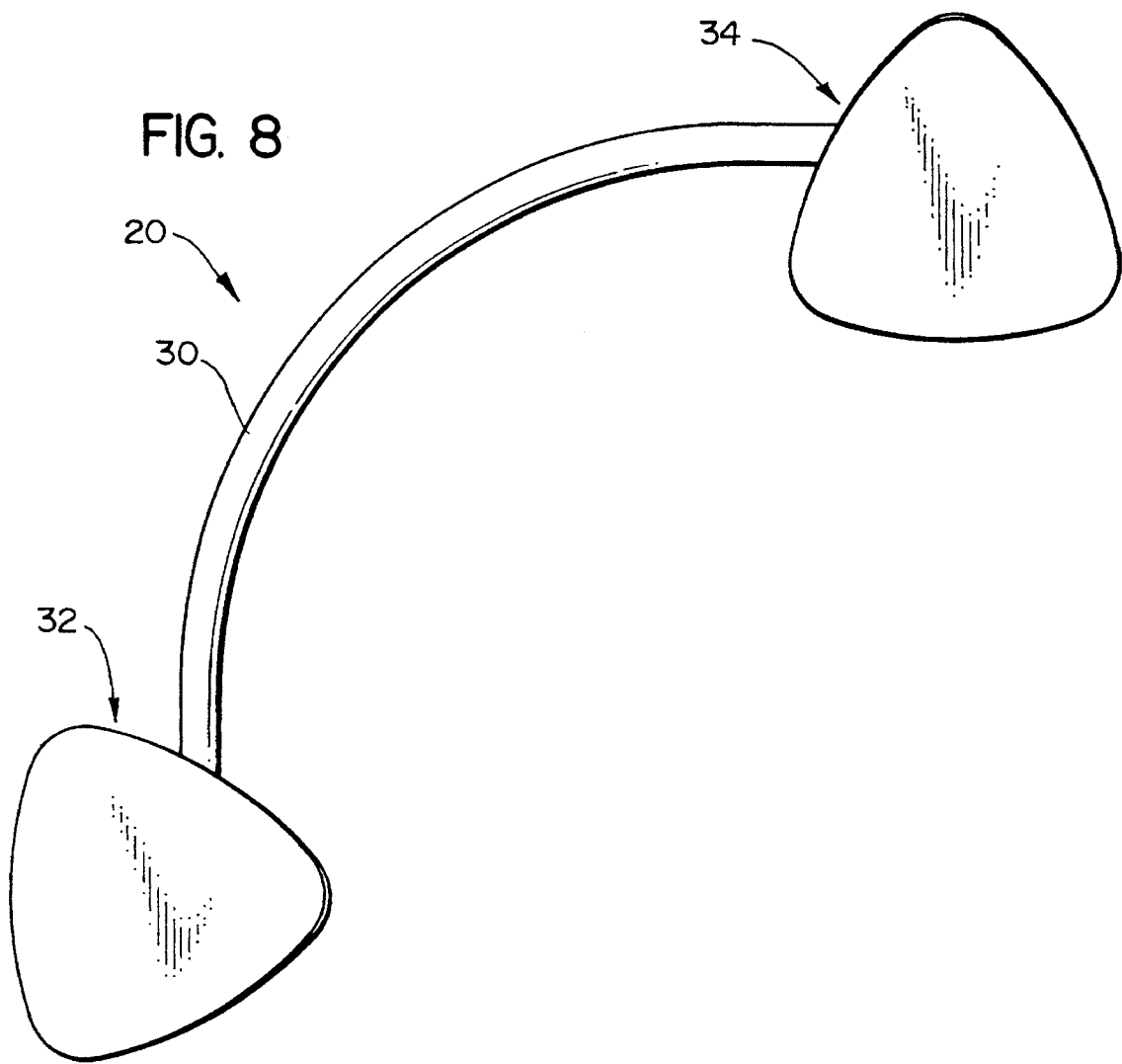

APPARATUS AND METHOD FOR HOLDING PAPER

TECHNICAL FIELD

The present invention relates to methods and apparatus for holding paper so that it can be easily read and, more particularly, such methods and apparatus for holding a sheet of paper in its desired location relative to a computer screen.

BACKGROUND OF THE INVENTION

In many situations, sheets of paper are desirably held in a given location to enhance the ability of a person to read text or view pictures contained thereon. For example, one person may revise a draft of a document by making corrections in ink on a sheet of paper on which the draft is printed. Subsequently, another person will set these changes on a computer holding that document in electronic form. It is highly desirable that the person setting the changes have the document located adjacent to the screen of the computer on which the changes are being set.

The applicant is aware of a number of devices for holding a sheet of paper that may be located adjacent to a computer or typewriter. These devices are traditionally in the form of a stand that is placed upright on a work surface such as a desk. With the rise in popularity of computers, a number of devices have become available that attach to the side of a computer monitor. Most of these devices are directly permanently attached to the housing of the computer monitor. Some of these devices use hook and pile fastener to attach an arm or the like to the monitor housing. In this case, one of the hook and pile materials is permanently attached to the housing, and the other of the hook and pile materials is attached to a structure adapted to support a sheet of paper or the like.

These prior art devices are very poorly suited to use with laptop computers. Laptop computers are usually made to fold up and fit into a carrying case for storage and transportation, and known paper support devices often interfere with the ability of the laptop computer to fold up and fit into its case. Further, even if the known devices can be made to work with a laptop computer, they are usually bulky and not made to withstand the rigors of transportation and/or repeated attachment and removal.

OBJECTS OF THE INVENTION

From the foregoing, it should be apparent that one of the primary objectives of the present invention is to provide improved apparatus and methods for holding sheets of paper in a desired location.

Another more specific object of the present invention is to provide apparatus and methods for holding sheets of paper having a favorable mix of the following characteristics.

a. optimized for use with laptop computers;
b. easily transportable;
c. easily reconfigurable to adapt to a variety of physical settings and/or lighting configurations;
d. do not require permanent alteration of the equipment adjacent to which the paper is to be placed;
e. do not require the dedication of precious work space for the purpose of supporting paper in a desired orientation; and
f. may be easily and inexpensively manufactured out of commercially available materials.

SUMMARY OF THE INVENTION

These and other objects are achieved by the present invention, which basically comprises an elongate member having a clip attached to each end thereof. One of these clips is adapted to attach an end of the elongate member to a structural member adjacent to a computer screen. The other of these clips is adapted to engage and hold the sheet of paper relative to the other end of the elongate flexible member. The elongate member itself may be manually reconfigured to adjust the position of the sheet of paper until it is in desired orientation for viewing.

The clips are preferably mounted onto the elongate flexible member such that the gripping portions of the clips are arranged in opposing directions. However, the preferred elongate flexible member may be twisted about its axis to vary the relative positions of the two clips.

For manufacturing purposes, it is desirable that each of the clips be adapted to engage both the gripping surface adjacent to the computer screen and the sheet of paper. If the clips are identical, only one part need be manufactured, yielding a simpler and less expensive manufacturing process. Further, this provides greater flexibility to the end user when the device is in use.

The preferred clips basically comprise two rigid members, a hinge member, and a spring. The two rigid members are pivotally connected by the hinge member. The spring is arranged to bias the rigid members such that engaging surfaces formed thereon are normally in contact.

In the preferred form, the engaging surfaces are formed by a resilient, non-abrasive material with a slightly tacky surface. This material is attached to each of the rigid members at the appropriate locations to form the gripping surfaces.

The hinge member is preferably a generally cylindrical plastic member that receives one end of the elongate member and which extends through holes in each of the rigid members to pivotally connect these members. To this end, locking projections are formed on one end of the hinge member and recesses are formed in this member to allow a slight deflection thereof. During assembly, the portion of the hinge member containing the locking projections is deflected inwardly to allow the hinge member to be inserted into the holes in the rigid members. When the locking projections have passed completely through the holes in the rigid members, the hinge member returns to its original, undeflected configuration, at which point the locking members engage one of the rigid members to prevent withdrawal of the hinge member.

The present invention in its exemplary forms is small and lightweight and thus easily transportable and stored when not in use. The clips employed allow the device to be attached and supported by the housing in which the screen of a laptop computer is mounted. However, the clips are designed for easy removal and not to cause any permanent damage or modifications to the computer housing.

As laptop computers are often used in situations where no work surface is available on which a sheet of paper can be mounted, the present invention is particularly useful in the context of a laptop computer.

Further, the present invention in its exemplary form can be manufactured with as few as thirteen parts and many of these parts are identical. The present invention may thus be easily and inexpensively manufactured.

BRIEF DESCRIPTION OF THE DRAWINGS

FIG. 1 is a perspective view of a paper holding apparatus constructed in accordance with, and embodying, the principles of the present invention shown in one context in which it will often be employed;

FIG. 2 is a section view taken along lines 2—2 in FIG. 1;

FIG. 7 is a top plan view of the present invention;

FIG. 8 is a side elevational view of the present invention, the opposite side view being a mirror image thereof;

DETAILED DESCRIPTION

Figure 3:
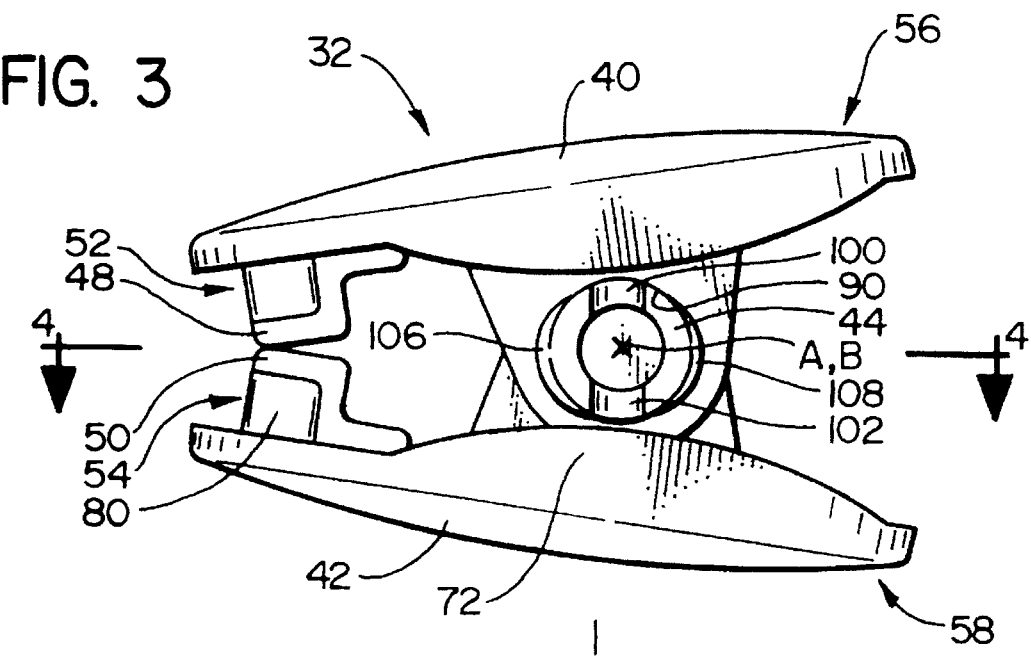
FIG. 3 is a side view of one of the clips forming a part of the paper holder shown in FIG. 1.

Referring now to the drawing, shown at 20 in FIG. 1 is a paper holding device constructed in accordance with, and embodying, the principles of the present invention. The paper holding device 20 is shown supporting a sheet of paper 22 in a desired orientation adjacent to a computer screen 24. The exemplary computer screen 24 is held in a housing 26 and forms a part of a laptop computer 28.

The paper holding device 20 basically comprises a flexible, elongate gooseneck assembly 30, a first clip 32, and a second clip 34. The first clip 32 is securely connected to a first end 36 of the elongate assembly 30, while the second clip 34 is securely connected to a second end 38 thereof.

The first clip is adapted to be attached to the screen housing 26 such that the first end 36 of the elongate assembly 30 is substantially fixed relative to the computer screen 24. Similarly, the second clip 34 engages the sheet of paper 22 to substantially inhibit relative movement between the paper 22 and the second end 38 of the elongate assembly 30.

With the clip 32 attached to the housing 26 and the clip 34 attached to the sheet of paper 22, the sheet of paper 22 is located adjacent to the computer screen 24 as shown in FIG. 1. In this location, the screen 24 and paper 22 may both be easily viewed by a user of the computer 28.

Further, the sheet of paper 22 may be manually placed into a desired orientation relative to the screen 24 simply by bending, twisting, or otherwise reconfiguring the flexible assembly 30. The user may thus orient the sheet of paper 22 into the optimal configuration for a given set of physical and lighting constraints.

As will be discussed in further detail below, the elongate flexible gooseneck assembly 30 may be manually reconfigured as just described but maintains sufficient rigidity or stiffness to maintain its configuration when subjected to relatively light loads. Accordingly, the orientation of the sheet of paper 22 with respect to the computer screen 24 may be changed and maintained in a wide range of configurations as desired.

Turning now to FIGS. 2–4 and FIGS. 7–11, the construction and operation of the paper holding device 20 will now be described in further detail.

The construction and operation of the clip 32 will initially be described with reference to FIGS. 2–4. At this point, it should be noted that exemplary clips 32 and 34 are identical and interchangeable. This interchangeability has been found to be highly desirable from a manufacturing perspective. Because these clips 32 and 34 are identical, only the clip 32 will be described in detail below.

In certain circumstances, it may be appropriate to use clips specifically tailored to engage either the screen housing 26 or the sheet of paper 22. The present invention in its broadest form should thus not be limited to a device comprising two identical clips.

Figure 4:
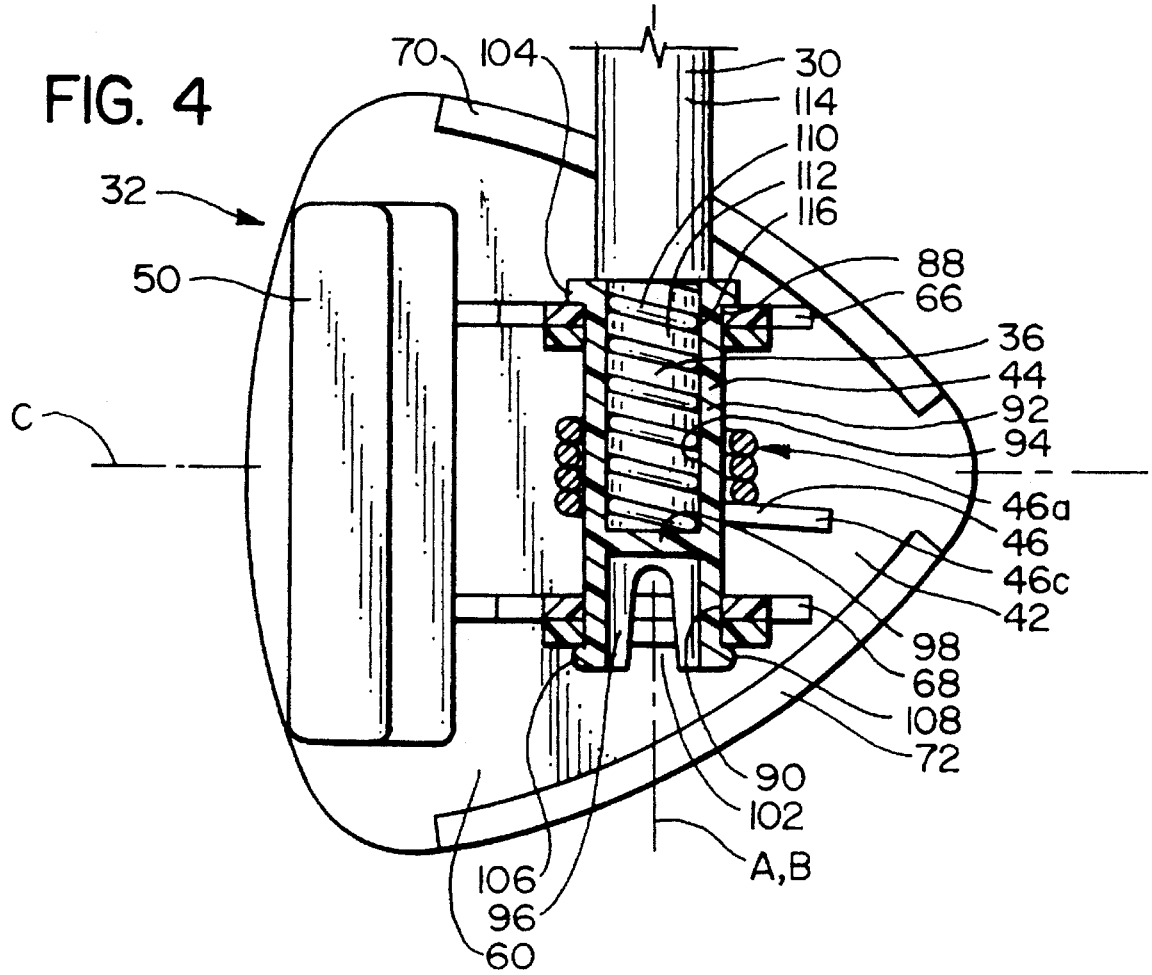
FIG. 4 is a section view taken along lines 4—4 in FIG. 3.

FIGS. 2–4 illustrate that the clip 32 basically comprises a first rigid member 40, a second rigid member 42, a hinge member 44, and a spring member 46. In its preferred form, the clip 32 further comprises first and second cushion members 48 and 50 securely attached to the rigid members 40 and 42, respectively.

In operation, the rigid members 40 and 42 are pivotally connected to each other by the hinge member 44 such that they can rotate about an axis A (FIGS. 3–4) of the hinge member 44.

The spring 46 is arranged to bias the rigid members 40 and 42 such that engaging portions 52 and 54 thereof, respectively, come into contact with each other as shown in FIG. 3. The biasing force applied by the spring 46 is light enough to allow a user to pinch lever portions 56 and 58 of the rigid members 40 and 42, respectively, together to open the clip 32 as shown in FIG. 2. When the clip 32 is open, the engaging portions 52 and 54 of the rigid members 40 and 42 are no longer in contact with each other.

The cushion members 48 and 50 are arranged over the contact portions 52 and 54 of the rigid members 40 and 42 such that it is these cushions 48 and 50, and not the rigid members 40 and 42, that come into contact.

The clip member 32 is thus normally held in the closed position by the bias of the spring 46, but may be opened with the appropriate manual pressure applied to the lever portions 56 and 58 as necessary.

The spring 46 is essentially conventional. The spring 46 is essentially a helical torsion spring having a generally cylindrical portion 46a and first and second forcing members 46b and 46c for transmitting the torsional force exerted by the spring 46 to the rigid members 40 and 42. The amount of force applied by the spring 46 should be great enough to grip either a structural member or an object to be supported in a secure manner but not so great that the clip cannot be manually opened.

The exemplary rigid members 40 and 42 are identical and are injection molded out of plastic. This allows the same mold to be used to produce both parts while reducing the overall number of parts used to manufacture the device 20. As these rigid members 40 and 42 are identical, only the rigid member 42 will be described in detail herein.

The rigid member 42 comprises a plate portion 60, and socket portion 62, a support portion 64, a first hinge flange 66, a second hinge flange 68, a first peripheral flange 70, and a second peripheral flange 72.

The plate portion 60 forms the main structural body of the rigid member 42. The exact shape of the plate portion 60 is not critical and can be tailored to suit the aesthetic requirements of such a consumer product. The only limitations on the shape of the rigid member 42 are that it has one end appropriate for forming the lever portion 58 and another end located opposite the hinge flanges 66 and 68 appropriate for forming the contacting portion 54. The thickness of this plate portion is also not crucial but should provide sufficient rigidity to the member 42 so that it may perform the clamping action required.

The socket portion 62 comprises two elongate side walls 74 and 76 and a pair of end walls 78 (FIG. 2) and 80 (FIG. 3). The side walls 74 and 76 and end walls 78 and 80 define a cavity 82.

The support portion 64 is formed by two short support ribs 84 and 86. These support ribs 84 and 86 support a portion of the cushion member 50; again, this will be described in further detail below. The peripheral flanges 70 and 72 are primarily decorative in form but serve to strengthen the plate portion 60.

The cushion portion 50 is attached to the rigid member 42 by engaging the socket portion 62 and rests on the support portion 64. Before continuing with a discussion of the rigid member 42, a brief description of the cusion members 48 and 50 is in order.

The cushion members 48 and 50 are identical so only the member 50 will be described herein in detail. As shown in FIG. 2, the cushion member 50 is extruded such that it has the following cross-sectional structure: (a) a first portion 50a; (b) a second portion 50b extending substantially orthogonally from the first portion 50a; (c) a third portion 50c extending substantially orthogonally from the second portion 50b opposite the first portion 50a; and (d) a fourth portion 50d extending substantially orthogonally from the third portion 50c.

The cushion member 50 is comprised of a thermoplastic rubber (TPR) or thermoplastic elastomer (TPE) such as those manufactured under the trade name KRAYTON by Shell Oil Co. Preferably, the KRAYTON materials sold under part numbers G-7705 and G-7722 will be used. This material may be continuously extruded and collected in rolls. It may then be reeled off these rolls and cut into the appropriate lengths for the use described herein.

Referring again to the assembly of the cushion member 50 onto the rigid member 42, the fourth portion 50d of the cushion member 50 is pressed down into the socket portion 62 of the rigid member 42 such that the side wall 76 is received between the cusion member second portion 50b and fourth portion 50d. The first portion 50a rests on and is supported by the ribs 84 and 86 forming the support portion 64 of the rigid member 42. Further, the third portion 50c covers the distal ends of the walls 74, 76, 78, and 80 forming the socket portion 62. The cushion member 50 thus covers the entire inner surface of the rigid member 42 where this member 42 is likely to come into contact with the screen housing 26.

The hinge flanges 66 and 68 extend from the plate portion 60 in a spaced apart, parallel relationship. In this relationship, holes 88 and 90 formed in the hinge flanges 66 and 68, respectively, are aligned along a common axis B. It should be noted that these hinge flanges 66 and 68 are not symmetrically arranged about a center line C (FIG. 4) of the rigid member 42; this asymmetry allows the identical part to be used for both the first and second rigid members 40 and 42, as briefly described above.

The hinge member 44 will now be described in further detail. The hinge member 44 basically comprises a main cylindrical portion 92 divided into first and second chambers 94 and 96 by a partition wall 98. The first chamber 94 is adapted to receive the first end 36 of the flexible elongate assembly 30. Notches 100 and 102 are formed in the cylindrical portion 92 defining the second chamber 96.

Additionally, an annular shoulder 104 is formed on one end of the cylindrical portion 92, while first and second locking projections 106 and 108 extend around at least a portion of the other end of the cylindrical portion 92. In the exemplary hinge member 44, the notches 100 and 102 oppose each other, and the locking projections 106 and 108 also oppose each other and are arranged between the notches 100 and 102.

Before the assembly of the clip 32 is discussed, a brief discussion of the exemplary elongate assembly 30 will be helpful. The elongate assembly 30 basically comprises first and second intertwined helical springs 110 and 112 and a plastic jacket or sleeve 114 covering a substantial portion of the sleeve springs 110 and 112. The sleeve 114 protects the springs 110 and 112, and the springs 110 and 112 interact to form an assembly 30 that is manually flexible but which retains its shape when subjected to relatively light loads.

As shown in FIG. 4, the sleeve 114 is shorter than the length of the springs 110 and 112 for reasons that will become apparent below.

The paper holding device 20 is assembled as follows. Initially, a small amount of conventional 5-minute epoxy 116 is applied to the exposed springs 110 and 112 and/or the interior of the first cavity 94 of the hinge member 44. The first end 36 is then inserted into the first cavity 94 as shown in FIG. 4. The epoxy flows or oozes between the springs 110 and 112 before it hardens. When the epoxy hardens, it interlocks with the springs 110 and 112 and bonds to the hinge member 144 to prevents relative movement therebetween.

The rigid members 40 and 42 are prepared for assembly by attaching the cushion members 48 and 50 thereto as described above. The holes in the hinge flanges of the rigid members 40 and 42 are next arranged such that the center axes thereof are aligned. When the holes in the hinge flanges are aligned, the center axis A of the hinge member 44 is then brought into alignment with the axis B of these holes, and the hinge member 44 is passed through the first two of these four aligned holes. At this point, the spring 46 is arranged such that the hinge member 44 will pass therethrough.

The hinge member 44 is then further displaced through the center of the spring member 46 and the holes in the remaining flange portions along the axis B until the shoulder 104 thereon contacts the hinge flange 66 as shown in FIG. 4.

Also, as shown in FIG. 4, the effective diameter of the end of the hinge member 44 distal from the elongate assembly 30 is made greater than the diameter of the holes in the flange members by the locking projections 106 and 108. To allow this end to pass through these holes, the side walls of the hinge member 44 are inwardly deflected to provide sufficient clearance to allow the leading edge of the hinge member 44 to pass through the holes in the flange members. The notches 100 and 102 formed in the hinge member 44 facilitate this deflection.

After the locking members 106 and 108 have passed through the last of the aligned holes in the hinge flanges, the hinge member returns to its original, undeflected state and the locking members 106 and 108 engage the last hinge flange to prevent inadvertent withdrawal of the hinge member 44. To facilitate the insertion of the hinge member 44, the locking projections 106 and 108 are rounded.

Both clips are mounted onto the elongate assembly 30 in the same manner, although in the preferred form they are arranged such that the engaging portions thereof point in opposite directions. This arrangement results in the least amount of distortion when the device 20 is used under the normal condition shown in FIG. 1. However, the flexibility of the elongate assembly 30 allows the relative angles of the clips to be changed, even to the point where the engaging portions thereof point in the same direction.

Referring now to FIGS. 1 and 2, the use of the paper holding device described above will be explained in further detail. These Figures show that a peripheral rim 118 extends around the edge on one side of the screen housing 26. While the screen housing 26 shown in FIGS. 1 and 2 is exemplary of many screen housings employed by currently available laptop computers, some computers may eliminate this rim 118, some computers have larger rims, some computers may have a rim extending on both sides of the housing 26. Regardless of the exact configuration of the particular screen housing to which the device 20 is to be attached, the clips 32 and 34 are designed to accommodate these different configurations.

In particular, it can be seen in FIG. 2 that the rim 118 contacts a surface 120 formed on the first portion of the cushion member 48. On the other side of the screen housing 56, a surface 122 on the third portion 50c of the cushion member 50 is in contact with an outer surface 124 of the housing 26. The contact portions 52 and 54 of the clip 32 thus each comprise two parallel, stepped, and spaced apart surfaces, either of which may engage the screen housing as appropriate. It should be clear from FIG. 2 that this arrangement allows other configurations of screen housings to be gripped by the clip 32.

Also, FIG. 1 shows that the clip 32 may be attached to a vertical side edge of the screen housing 26. It may also be attached to the horizontal upper edge of the screen housing 26 or even to any other structural member that, at least for the time of the user's session at the computer, is in a fixed relationship with the computer screen 24.

While the exact dimensions of the device 20 are not critical, the following table sets forth preferred values and ranges for certain of these dimensions:

| Dimension: | Preferred: | First Preferred Range | Second Preferred Range (if any) |
|---|---|---|---|
| x1 | 1" | ½"–1½" | |
| x2 | 1½" | ¾"–2" | |
| x3 | 10" | 10–12" | 6–16" |

In this table, X1 and X2 refer to the dimensions shown in FIG. 2 when the clip is opened to it maximum and X3 refers to the length of the elongage assembly 30.

Figure 5:
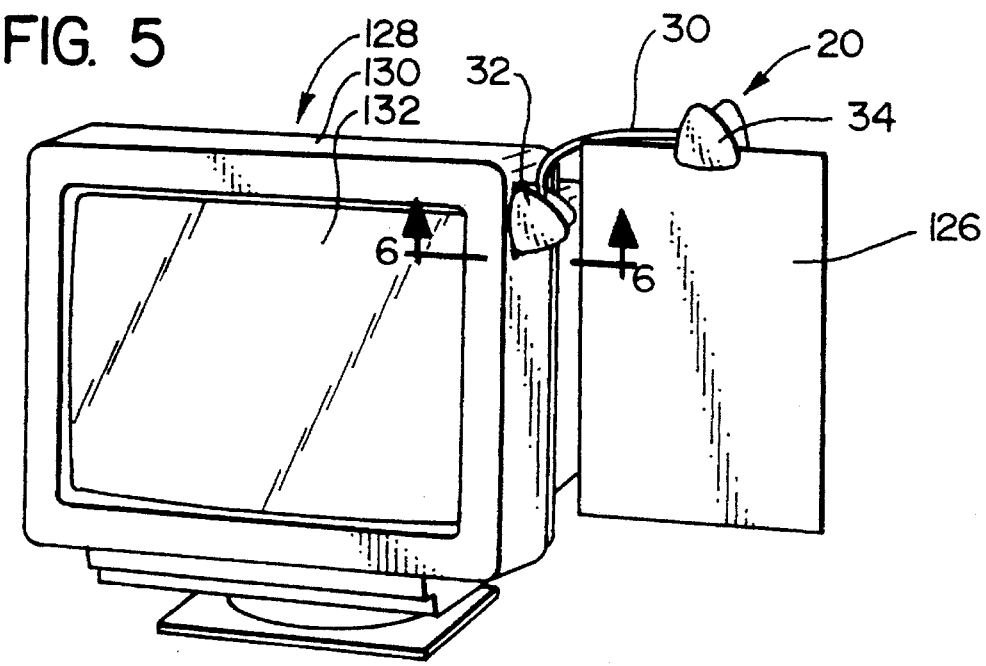
FIG. 5 is a perspective view of the present invention adapted for use in yet another context.
Figure 6:
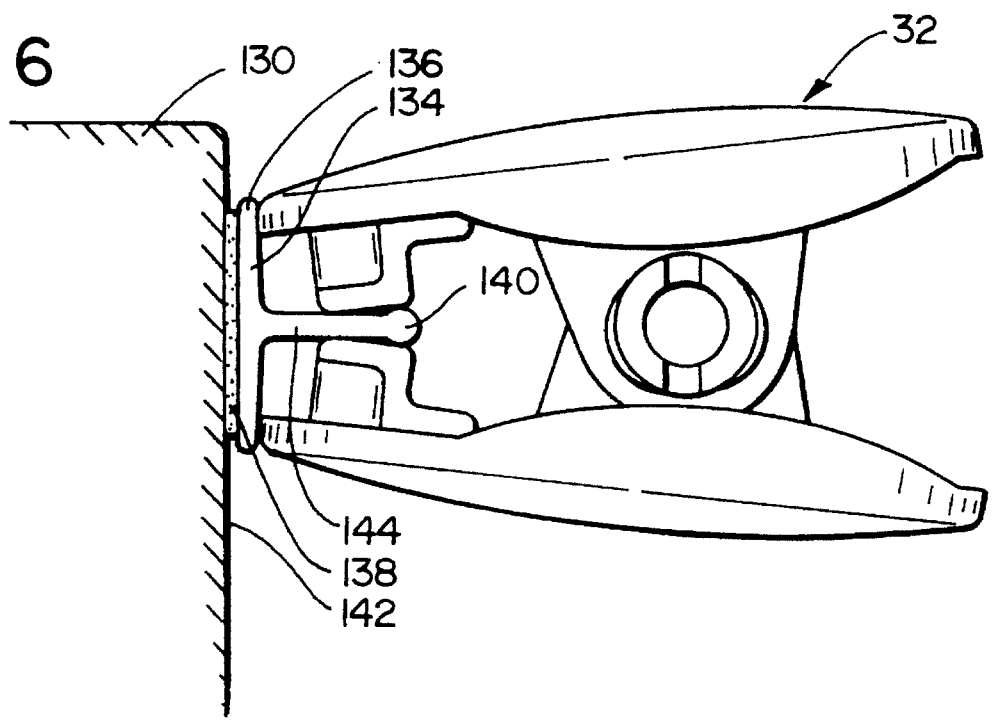
FIG. 6 is a section view taken along lines 6—6 in FIG. 5.
Figure 9:
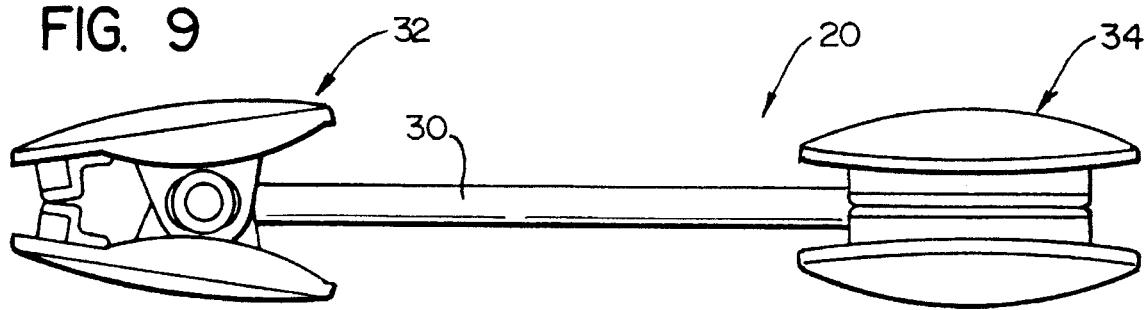
FIG. 9 is a bottom plan view of the present invention.
Figure 10:
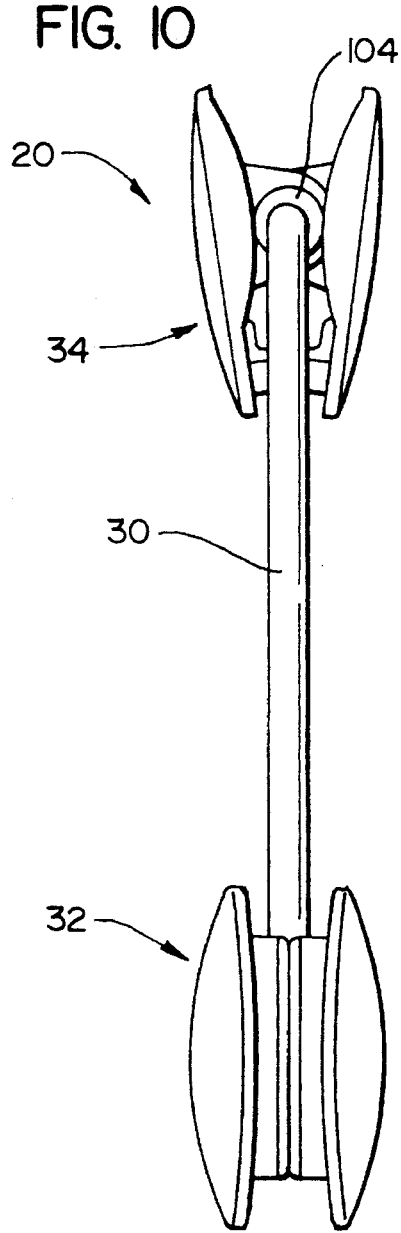
FIG. 10 is an elevational view of a first end of the present invention.
Figure 11:
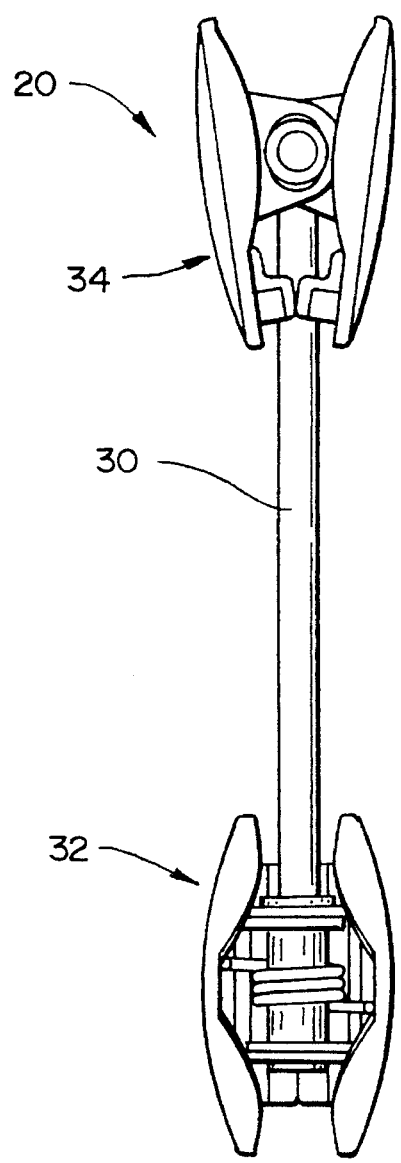
FIG. 11 is an elevational view of a second end of the present invention.

Referring now to FIGS. 5 and 6, shown therein is yet another use of the paper holding device described above. In FIG. 5, the device 20 suspends a sheet of paper 126 adjacent to a computer monitor 128 comprising a housing 130 containing a CRT 132. In this case, the housing 130 is too thick for the clip 32 to be attached directly to this housing 130, and a separate intermediate member 134 as shown in FIG. 6 is employed. The intermediate member 134 has a generally T-shaped cross section and comprises a flat mounting plate 136, adhesive layer 138, and an outwardly projecting connecting flange 140. The adhesive layer 138 is applied to the mounting plate 136 to rigidly connect this plate 136 to an exterior surface 142 of the housing 130. The flange 140 extending from the plate 136 has an external surface 144 suitable for attachment of the clip 32.

The paper holding device 20 as described herein may be used in an almost limitless number of environments to support an object for viewing. When the device 20 is used alone, the only limits are that one of the clips must be attachable to a structural member that will support the weight of the device and any object supported at the other end thereof and, once the device 20 is so mounted to a structural member, the only other limitation is that the object being supported thereby must be grippable by the other clip and not too heavy so as to cause the elongate assembly 30 to bend simply under the weight of the object being supported.

From the foregoing, it should be clear that the present invention may be embodied in forms other than those described above. The scope of the present invention should thus be determined in accordance with the scope of the claims attached hereto and not the foregoing detailed description.

What is claimed is:

1. An apparatus for placing a first object in a desired orientation adjacent to a second object, comprising:

a flexible member having first and second ends and comprising first and second intertwined helical springs;

first clip means connected to the first end of the flexible member for engagin a gripping surface fixedly located adjacent to the second object in a manner that inhibits relative movement between the first end of the flexible member and the second object;

second clip means connected to the second end of the flexible member for engaging the first object in a manner that inhibits relative movement between the second end of the flexible member and the first object; wherein the first and second intertwined helical springs engage each other such that the flexible member may be manually reconfigured to place the first object in the desired orientation.

2. A method of placing a first object in a desired orientation adjacent to a second object, comprising the steps of:

providing a flexible member having first and second ends and comprising first and second intertwined helical springs, where the first and second intertwined helical springs engage each other such that the flexible member may be manually reconfigured but retains its shape when subjected to light loads;

securely connecting a first clip to the first end of the flexible member;

securely connecting a second clip to the second end of the flexible member;

attaching the first clip to a gripping surface located adjacent to the second object;

attaching the second clip to the first object;

manipulating the flexible member to reconfigure the flexible member such that the first object is in the desired orientation.

* * * * *